(12) United States Patent
Bandi et al.

(10) Patent No.: US 12,697,995 B2
(45) Date of Patent: Aug. 4, 2026

(54) SYSTEMS AND METHODS OF EVALUATING AN EXTERIOR QUALITY OF A VEHICLE

(71) Applicant: Ford Global Technologies, LLC, Dearborn, MI (US)

(72) Inventors: Krishna Bandi, Novi, MI (US); Meghna Menon, Ann Arbor, MI (US); Gregory P. Linkowski, Dearborn, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 18/423,723

(22) Filed: Jan. 26, 2024

(65) Prior Publication Data

US 2025/0242829 A1 Jul. 31, 2025

(51) Int. Cl.
*B60W 60/00* (2020.01)
*G06T 7/00* (2017.01)
*G06V 10/75* (2022.01)
*G06V 10/82* (2022.01)

(52) U.S. Cl.
CPC ......... *B60W 60/001* (2020.02); *G06T 7/0002* (2013.01); *G06V 10/751* (2022.01); *G06V 10/82* (2022.01); *B60W 2556/45* (2020.02); *G06T 2207/20084* (2013.01); *G06V 2201/08* (2022.01)

(58) Field of Classification Search
CPC .. G06V 10/82; G06V 10/751; G06V 2201/08; G06T 7/002; G06T 2207/20084; B60W 2556/45
See application file for complete search history.

(56) References Cited

U.S. PATENT DOCUMENTS

| | | | | |
|---|---|---|---|---|
| 7,962,898 | B1 * | 6/2011 | Petry ..................... | G06V 10/95 |
| | | | | 717/124 |
| 12,181,862 | B2 * | 12/2024 | Arthur .................. | G06T 7/0004 |
| 2006/0026017 | A1 | 2/2006 | Walker | |
| 2007/0079012 | A1 | 4/2007 | Walker | |
| 2017/0147991 | A1 | 5/2017 | Franke et al. | |
| 2017/0200197 | A1 | 7/2017 | Brubaker | |
| 2018/0312121 | A1 * | 11/2018 | Weber ................. | B60R 16/0236 |
| 2018/0373268 | A1 | 12/2018 | Antunes Marques Esteves | |
| 2019/0020985 | A1 | 1/2019 | Dai et al. | |
| 2019/0349794 | A1 | 11/2019 | Tavares Coutinho et al. | |
| 2020/0065776 | A1 * | 2/2020 | Kingsley ................. | H04L 67/55 |
| 2021/0072034 | A1 | 3/2021 | Meroux et al. | |
| 2022/0197450 | A1 | 6/2022 | Jobs et al. | |

(Continued)

FOREIGN PATENT DOCUMENTS

| | | |
|---|---|---|
| EP | 3743713 | 12/2022 |
| GB | 2578807 | 5/2020 |

(Continued)

*Primary Examiner* — Jelani A Smith
(74) *Attorney, Agent, or Firm* — Burris Law, PLLC

(57) ABSTRACT
A method for obtaining a first set of images of an exterior of one or more vehicles, determining a condition of the exterior of the one or more vehicles by an automated vehicle marshaling algorithm of an infrastructure system, and causing the one or more vehicles to navigate toward a waypoint and capture one or more characteristics associated with the one or more vehicles.

18 Claims, 8 Drawing Sheets

(56)     References Cited

U.S. PATENT DOCUMENTS

| 2022/0353732 | A1 |  | 11/2022 | Filippou et al. | |
| 2022/0414617 | A1 |  | 12/2022 | Oehler et al. | |
| 2023/0145508 | A1 |  | 5/2023 | Kaphengst et al. | |
| 2025/0083761 | A1 | * | 3/2025 | Iwahori | G06Q 10/063 |

FOREIGN PATENT DOCUMENTS

| WO | WO-2019186530 | A1 | * | 10/2019 | G06V 10/751 |
| WO | WO-2019186545 | A1 | * | 10/2019 | G06T 7/246 |

* cited by examiner

800

OBTAINING A FIRST SET OF IMAGES OF AN EXTERIOR
OF ONE OR MORE VEHICLES
802

DETERMINING A CONDITION OF THE EXTERIOR OF THE
ONE OR MORE VEHICLES
804

CAUSING THE ONE OR MORE VEHICLES TO NAVIGATE
TOWARD A WAYPOINT AND CAPTURE ONE OR MORE
CHARACTERISTICS ASSOCIATED WITH THE ONE OR
MORE VEHICLES
806

SYSTEMS AND METHODS OF EVALUATING AN EXTERIOR QUALITY OF A VEHICLE

FIELD

The present disclosure relates to the evaluation of a condition of an exterior of a marshaled vehicle. More specifically, the present disclosure relates to systems and methods directed toward the marshaling of a vehicle to particular waypoints based on the condition of the exterior of the marshaled vehicle.

BACKGROUND

The statements in this section merely provide background information related to the present disclosure and may not constitute prior art.

During vehicle development and usage, inefficiencies associated with the identification of vehicle exterior quality issues at multiple points may exist. For example, manual inspection of a vehicle in a manufacturing plant may potentially lead to inadvertently missing an exterior quality check and/or not inspecting the exterior of the vehicle as often as may be desirable. As another example, not reporting an issue with a vehicle in a dealer depot can result in vehicle exterior quality issues going unreported, which may cause delays in repair. As an additional example, inspection of a vehicle exterior quality before and/or after a car is rented or in the possession of a valet-parking service can cause issues with respect to determining an at-fault party if any quality issues associated with the exterior of the vehicle arises. Such issues may result from, for example, documentation issues relating to the exterior of the vehicle at various points of possession of the vehicle.

The present disclosure addresses these and other issues related to the evaluation and/or documentation of a condition of an exterior quality of a vehicle and marshaling of the same.

SUMMARY

This section provides a general summary of the disclosure and is not a comprehensive disclosure of its full scope or all of its features.

The present disclosure provides a method comprising: obtaining, by one or more sensors of an infrastructure system, a first set of images of an exterior of one or more vehicles; determining, by an automated vehicle marshaling algorithm of the infrastructure system, a condition of the exterior of the one or more vehicles, wherein the determination of the condition of the exterior of the one or more vehicles is based on the first set of images; and causing, based on the condition of the exterior of the one or more vehicles not satisfying a quality check, the one or more vehicles to navigate toward a waypoint and capture one or more characteristics associated with the one or more vehicles; further comprising: determining whether the condition satisfies the quality check; wherein the condition of the one or more vehicles comprises a condition of a vehicle paint, one or more vehicle dents, a vehicle exterior part misalignment, an incorrect trim package associated with the one or more vehicles, or a combination thereof; further comprising: transmitting, to a vehicle manufacturing cloud system, based on the condition of the exterior of the one or more vehicles not satisfying the quality check, a marshaling status of the one or more vehicles; and causing, based on the transmission of the marshaling status of the one or more vehicles, the vehicle manufacturing cloud system to store the first set of images of the exterior of the one or more vehicles; further comprising: receiving, from the one or more vehicles, the one or more characteristics, wherein the one or more characteristics serve as investigative proof associated with the condition of the exterior of the one or more vehicles, and wherein the one or more characteristics include a location associated with the one or more vehicles, a snapshot recording of the exterior of the one or more vehicles, or a combination thereof; further comprising: obtaining, by the one or more sensors of the infrastructure system, a second set of images of the exterior of the one or more vehicles; comparing, by the automated vehicle marshaling algorithm and a neural network module of the infrastructure system, the first set of images with the second set of images; and determining, based on the comparison of the first set of images and the second set of images, a difference between the first set of images and the second set of images, wherein an outcome of the determination of the difference between the first set of images and the second set of images is saved in a database associated with the infrastructure system, and wherein the saved outcome serves as investigative proof associated with the condition of the exterior of the one or more vehicles; wherein the one or more characteristics associated with the one or more vehicles are captured via one or more vehicle sensors.

The present disclosure provides a system comprising: an infrastructure system configured to: obtain, by one or more sensors of the infrastructure system, a first set of images of an exterior of one or more vehicles, determine, by an automated vehicle marshaling algorithm of the infrastructure system, a condition of the exterior of the one or more vehicles, wherein the determination of the condition of the exterior of the one or more vehicles is based on the first set of images, and cause, based on the condition of the exterior of the one or more vehicles not satisfying a quality check, the one or more vehicles to navigate toward a waypoint and capture one or more characteristics associated with the one or more vehicles; a vehicle manufacturing cloud system configured to: receive a marshaling status of the one or more vehicles, and store the first set of images of the exterior of the one or more vehicles; and the one or more vehicles configured to: capture the one or more characteristics via one or more vehicle sensors, and transmit the one or more characteristics; further comprising: determining whether the condition satisfies the quality check; wherein the condition of the one or more vehicles comprises a condition of a vehicle paint, one or more vehicle dents, a vehicle exterior part misalignment, an incorrect trim package associated with the one or more vehicles, or a combination thereof; wherein the infrastructure system is further configured to: transmit, based on the condition of the exterior of the one or more vehicles not satisfying the quality check, a marshaling status of the one or more vehicles; and cause, based on the transmission of the marshaling status of the one or more vehicles, the vehicle manufacturing cloud system to store the first set of images of the exterior of the one or more vehicles; wherein the infrastructure system is further configured to: receive the one or more characteristics, wherein the one or more characteristics serve as investigative proof associated with the condition of the exterior of the one or more vehicles, and wherein the one or more characteristics include a location associated with the one or more vehicles, a snapshot recording of the exterior of the one or more vehicles, or a combination thereof; wherein the infrastructure system is further configured to: obtain, by the one or more sensors of the infrastructure system, a second set of images of the exterior of the one or more vehicles; compare, by the automated vehicle marshaling algorithm and a neural network module of the infrastructure system, the first set of images with the second set of images; and determine, based on the comparison of the first set of images and the second set of images, a difference between the first set of images and the second set of images, wherein an outcome of the determination of the difference between the first set of images and the second set of images is saved in a database associated with the infrastructure system, and wherein the saved outcome serves as investigative proof associated with the condition of the exterior of the one or more vehicles.

The present disclosure provides one or more non-transitory computer-readable media storing processor-executable instructions that, when executed by at least one processor, cause the at least one processor to: obtain, by one or more sensors of an infrastructure system, a first set of images of an exterior of one or more vehicles; determine, by an automated vehicle marshaling algorithm of the infrastructure system, a condition of the exterior of the one or more vehicles, wherein the determination of the condition of the exterior of the one or more vehicles is based on the first set of images; and cause, based on the condition of the exterior of the one or more vehicles not satisfying a quality check, the one or more vehicles to navigate toward a waypoint and capture one or more characteristics associated with the one or more vehicles; wherein the at least one processor is further caused to: determine whether the condition satisfies the quality check; wherein the condition of the one or more vehicles comprises a condition of a vehicle paint, one or more vehicle dents, a vehicle exterior part misalignment, an incorrect trim package associated with the one or more vehicles, or a combination thereof; wherein the at least one processor is further caused to: transmit, to a vehicle manufacturing cloud system, based on the condition of the exterior of the one or more vehicles not satisfying the quality check, a marshaling status of the one or more vehicles; and cause, based on the transmission of the marshaling status of the one or more vehicles, the vehicle manufacturing cloud system to store the first set of images of the exterior of the one or more vehicles; wherein the at least one processor is further caused to: receive, from the one or more vehicles, the one or more characteristics, wherein the one or more characteristics serve as investigative proof associated with the condition of the exterior of the one or more vehicles, and wherein the one or more characteristics include a location associated with the one or more vehicles, a snapshot recording of the exterior of the one or more vehicles, or a combination thereof; wherein the at least one processor is further caused to: obtain, by the one or more sensors of the infrastructure system, a second set of images of the exterior of the one or more vehicles; compare, by the automated vehicle marshaling algorithm and a neural network module of the infrastructure system, the first set of images with the second set of images; and determine, based on the comparison of the first set of images and the second set of images, a difference between the first set of images and the second set of images, wherein an outcome of the determination of the difference between the first set of images and the second set of images is saved in a database associated with the infrastructure system, and wherein the saved outcome serves as investigative proof associated with the condition of the exterior of the one or more vehicles; and wherein the one or more characteristics associated with the one or more vehicles are captured via one or more vehicle sensors.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
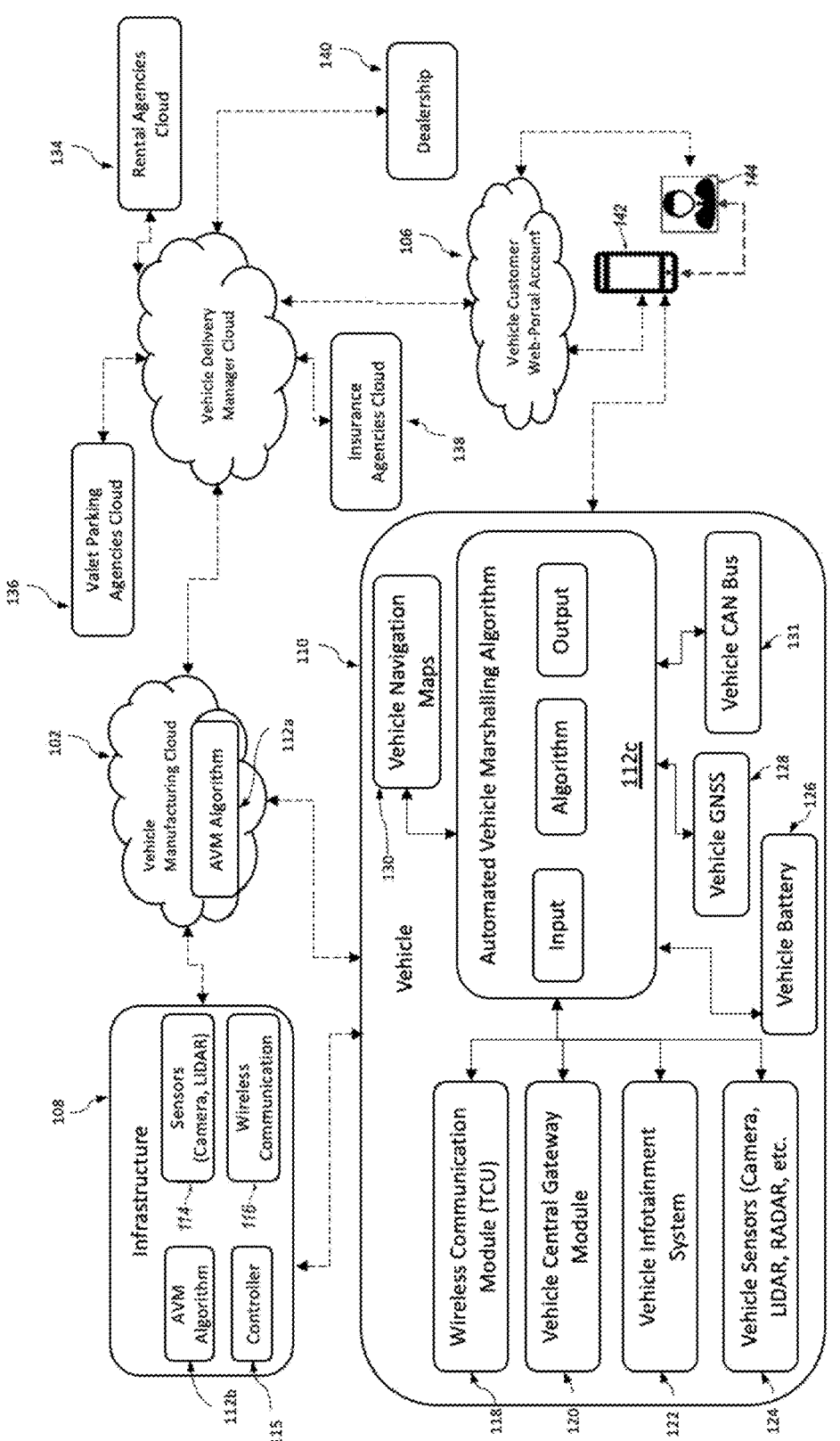
FIG. 1 illustrates an overall system for automated vehicle marshaling in accordance with various implementations.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a means for infrastructure-based sensing that facilitates autonomous functionality while simultaneously obtaining additional information relating to the status of an exterior of the vehicle. For example, multiple (e.g., repeated) quality checks associated with the exterior of the vehicle, made by one or more sensors of at least one infrastructure system, are completed in a manufacturing facility instead of a single manual visual inspection. The quality checks associated with the exterior of the vehicle can result in a more accurate process than a single manual visual inspection. As another example, by utilizing the one or more sensors, a reliance on drivers to timely report issues with the vehicle that ultimately cause repair delays is removed within dealer-depots. As a further example, an automated inspection of the vehicle as it departs a rental car agency and immediately upon return of the vehicle creates an objective comparison at different points in time. As yet another example, customer concerns can be alleviated by an automated visual inspection of the vehicle upon arrival and departure of the vehicle within an automated parking depot, which can also reduce the likelihood of misplaced insurance claims by the vehicle owners and/or the parking depot owners. For example, the exterior quality or condition of the vehicle can be checked during alignment of the vehicle to an automated charging station as the vehicle approaches the charging station. In this way, evidence (e.g., documentation) can be provided that any quality issues associated with the exterior of the vehicle did not occur at the autonomous charging station, for example.

FIG. 1 shows a schematic block diagram illustration of an autonomous vehicle marshaling (AVM) system 100. The AVM system 100, in one or more examples, marshals one or more autonomous vehicles traveling at a low speed. However, it is understood that the AVM system 100 may marshal one or more vehicles traveling at any speed. It is also understood that the AVM system 100 may marshal semi-autonomous vehicles and/or fully autonomous vehicles.

The AVM system 100 generally includes a vehicle manufacturing cloud system 102, a vehicle delivery manager cloud system 104, a vehicle customer web-portal account cloud system 106, an infrastructure system 108, and an autonomous vehicle 110. The vehicle manufacturing cloud system 102 operates as the central cloud system that manages and/or facilitates any manufacturing process associated with the autonomous vehicle 110. The vehicle manufacturing cloud system 102 wirelessly communicates with the vehicle delivery manager cloud system 104 and the infrastructure system 108. The vehicle manufacturing cloud system 102 also wirelessly communicates with the autonomous vehicle 110 directly. One or more examples provide improved exterior vehicle quality evaluation and/or documentation with one or more of the systems.

The vehicle manufacturing cloud system 102 includes an AVM algorithm 112a. The AVM algorithm 112a processes status information associated with at least the autonomous vehicle 110 of the one or more autonomous vehicles. It is understood that the AVM algorithm 112a processes status information associated with each autonomous vehicle of the one or more autonomous vehicles. The vehicle manufacturing cloud system 102 is configured to cause the infrastructure system 108 to monitor the progression of the one or more autonomous vehicles (e.g., the autonomous vehicle 110) as the autonomous vehicle(s) progress through a factory floor or parking lot, for example. The vehicle manufacturing cloud system 102 is also configured to cause the infrastructure system 108 to communicate with any of the one or more autonomous vehicles. For example, the vehicle manufacturing cloud system 102 utilizes the AVM algorithm 112a to send instructions to the infrastructure system 108 and/or to process information received from the infrastructure system 108. The vehicle manufacturing cloud system 102 is configured to cause the vehicle delivery manager cloud system 104 to facilitate a delivery of the one or more autonomous vehicles to various locations. For example, the vehicle manufacturing cloud system 102 utilizes the AVM algorithm 112a to send instructions to the vehicle delivery manager cloud system 104 and/or to process information received from the vehicle delivery manager cloud system 104.

The vehicle manufacturing cloud system 102 is also configured to cause the one or more autonomous vehicles to start, stop, or pause progression through a factory floor or parking lot, for example. The vehicle manufacturing cloud system 102 is further configured to control a marshaling speed of any of the one or more autonomous vehicles as the one or more autonomous vehicles traverse the factory floor or parking lot, for example. In some examples, the vehicle manufacturing cloud system 102 utilizes the AVM algorithm 112a to send instructions to the autonomous vehicle 110 and/or to process information received from the autonomous vehicle 110.

The infrastructure system 108 includes an AVM algorithm 112b, one or more sensors 114, and a sensor component 116. The sensor component 116 provides for communication between one or more infrastructures and the one or more autonomous vehicles. For example, the sensor component 116 may utilize GPS, Wi-Fi, satellite, 3G/4G/5G, and/or Bluetooth™ to communicate with the one or more autonomous vehicles. The sensor component 116 also communicates with the one or more sensors 114, such as, for example, one or more of cameras, lidar, radar, and/or ultrasonic devices. The one or more sensors 114 monitor the movement of the one or more autonomous vehicles as the autonomous vehicle(s) traverse, for example, the factory floor or parking lot. As an example, the infrastructure system 108 utilizes the AVM algorithm 112b to process and send information to the vehicle manufacturing cloud system 102 and/or to process information received from the vehicle manufacturing cloud system 102. As another example, the infrastructure system 108 utilizes the AVM algorithm 112b to process and send information directly to the autonomous vehicle 110 and/or to process information received from the autonomous vehicle 110. It is understood that the infrastructure system 108 can forward instructions received from the vehicle manufacturing cloud system 102 to the autonomous vehicle 110. However, it is also understood that the infrastructure system 108 can send instructions to the autonomous vehicle 110 directly.

Additionally, the infrastructure system 108 includes an infrastructure controller 115. The infrastructure controller 115 is configured to centrally control the operation of the autonomous vehicle 110. For example, the operation of the autonomous vehicle 110 includes propulsion, braking, and steering of the autonomous vehicle 110. It is understood that the infrastructure controller 115 may be disposed within the infrastructure system 108 or externally located relative to the infrastructure system 108. For example, in a marshaling environment, the infrastructure system 108 wirelessly broadcasts a marshaling infrastructure-message to the autonomous vehicle 110. As another example, the marshaling infrastructure-message is broadcasted over a vehicle-to-everything (V2X) protocol. However, it is understood that any communication means, including any communication protocol, may be used to broadcast the marshaling infrastructure-message.

The autonomous vehicle 110 includes one or more systems or components that implement or use an AVM algorithm 112c, a wireless transmission module 118, a vehicle central gateway module 120, a vehicle infotainment system 122, one or more vehicle sensors 124, a vehicle battery 126, a vehicle global navigation satellite system (GNSS) 128, vehicle navigation maps 130, and a vehicle CAN bus 132. The wireless transmission module 118 may be a transmission control unit. The wireless transmission module 118 includes one or more sensors that are configured to gather data and send signals to other components of the autonomous vehicle 110. The one or more sensors of the wireless transmission module 118 may include a vehicle speed sensor (not shown) configured to determine a current speed of the autonomous vehicle 110; a wheel speed sensor (not shown) configured to determine if the autonomous vehicle 110 is traveling at an incline or a decline; a throttle position sensor (not shown) determines if a downshift or upshift of one or more gears associated with the autonomous vehicle 110 is required in a current status of the autonomous vehicle 110; and/or a turbine speed sensor (not shown) configured to send data associated with a rotational speed of a torque converter of the autonomous vehicle 110. The wireless transmission module 118 communicates information, obtained by the one or more sensors, to the AVM algorithm 112c. For example, the autonomous vehicle 110 utilizes the AVM algorithm 112c to process and send information gathered by the one or more sensors to the infrastructure system 108. As another example, the autonomous vehicle 110 utilizes the AVM algorithm 112c to process and send information obtained by the one or more sensors to the vehicle manufacturing cloud system 102 directly. The AVM algorithm 112*c* is configured to communicate information and/or instructions to the wireless transmission module 118 received from the infrastructure system 108 and/or the vehicle manufacturing cloud system 102.

The vehicle central gateway module 120 operates as an interface between various vehicle domain bus systems, such as an engine compartment bus (not shown), an interior bus (not shown), an optical bus for multimedia (not shown), a diagnostic bus for maintenance (not shown), or the vehicle CAN bus 132. The vehicle central gateway module 120 is configured to distribute data communicated to the vehicle central gateway module 120 by each of the various domain bus systems to other components of the autonomous vehicle 110. The vehicle central gateway module 120 is also configured to distribute information received from the AVM algorithm 112*c* to the various domain bus systems. The vehicle central gateway module 120 is further configured to send information to the AVM algorithm 112*c* received from the various domain bus systems. For example, the autonomous vehicle 110 utilizes the AVM algorithm 112*c* to process and send information received from the vehicle central gateway module 120 to the infrastructure system 108. As another example, the autonomous vehicle 110 utilizes the AVM algorithm 112*c* to process and send information received from the vehicle central gateway module 120 to the vehicle manufacturing cloud system 102 directly. The AVM algorithm 112*c* is configured to communicate information and/or instructions to the vehicle central gateway module 120 received from the infrastructure system 108 and/or the vehicle manufacturing cloud system 102.

The vehicle infotainment system 122 is a system that delivers a combination of information and entertainment content and/or services to an operator 144 of the autonomous vehicle 110. It is understood that the vehicle infotainment system 122 can deliver entertainment content to the operator 144 of the autonomous vehicle 110, in some examples. It is also understood that the vehicle infotainment system 122 can deliver information services to the operator 144 of the autonomous vehicle 110, in some examples. In one or more examples, the vehicle infotainment system 122 includes built-in car computers that combine one or more functions, such as digital radios, built-in cameras, and/or televisions. The vehicle infotainment system 122 communicates information associated with the built-in car computers or processors to the AVM algorithm 112*c*. For example, the autonomous vehicle 110 utilizes the AVM algorithm 112*c* to process and send information received from the vehicle infotainment system 122 to the infrastructure system 108. As another example, the autonomous vehicle 110 utilizes the AVM algorithm 112*c* to process and send information received from the vehicle infotainment system 122 to the vehicle manufacturing cloud system 102 directly. The AVM algorithm 112*c* is configured to communicate information and/or instructions to the vehicle infotainment system 122 received from the infrastructure system 108 and/or the vehicle manufacturing cloud system 102.

The one or more vehicle sensors 124 may be, for example, one or more of cameras, lidar, radar, and/or ultrasonic devices. For example, ultrasonic devices utilized as the one or more vehicle sensors 124 emit a high frequency sound wave that hits an object (e.g., a wall or another vehicle) and is then reflected back to the autonomous vehicle 110. Based on the amount of time it takes for the sound wave to return to the autonomous vehicle 110, the autonomous vehicle 110 can determine the distance between the one or more vehicle sensors 124 and the object. As another example, camera devices utilized as the one or more vehicle sensors 124 provide a visual indication of a space around the autonomous vehicle 110. As an additional example, radar devices utilized as the one or more vehicle sensors 124 emit electromagnetic wave signals that hit the object and is then reflected back to the autonomous vehicle 110. Based on the amount of time it takes for the electromagnetic waves to return to the autonomous vehicle 110, the autonomous vehicle 110 can determine a range, velocity, and angle of the autonomous vehicle 110 relative to the object.

The one or more vehicle sensors 124 communicate information associated with the position and/or distance at which the autonomous vehicle 110 is relative to the object to the AVM algorithm 112*c*. For example, the vehicle 110 utilizes the AVM algorithm 112*c* to process and send information received from the one or more vehicle sensors 124 to the infrastructure system 108. As another example, the autonomous vehicle 110 utilizes the AVM algorithm 112*c* to process and send information received from the one or more vehicle sensors 124 to the vehicle manufacturing cloud system 102 directly. The AVM algorithm 112*c* is configured to communicate information and/or instructions to the one or more vehicle sensors 124 received from the infrastructure system 108 and/or the vehicle manufacturing cloud system 102.

The vehicle battery 126 is controlled by a battery management system (not shown) that provides instructions to the vehicle battery 126. For example, the battery management system provides instructions to the vehicle battery 126 based on a temperature of the vehicle battery 126. The battery management system ensures acceptable current modes of the vehicle battery 126. For example, the acceptable current modes protect against overvoltage, overcharge, and/or overheating of the vehicle battery 126. As another example, the temperature of the vehicle battery 126 indicates to the battery management system whether any of the acceptable current modes are within acceptable temperate ranges. The battery management system associated with the vehicle battery 126 communicates information associated with the temperature of the vehicle battery 126 to the AVM algorithm 112*c*. For example, the autonomous vehicle 110 utilizes the AVM algorithm 112*c* to process and send information received regarding the vehicle battery 126 to the infrastructure system 108. As another example, the autonomous vehicle 110 utilizes the AVM algorithm 112*c* to process and send information regarding the vehicle battery 126 to the vehicle manufacturing cloud system 102 directly. The AVM algorithm 112*c* is configured to communicate information and/or instructions to the vehicle battery 126 received from the infrastructure system 108 and/or the vehicle manufacturing cloud system 102.

The vehicle GNSS 128 is configured to communicate with satellites so that the autonomous vehicle 110 can determine a specific location of the autonomous vehicle 110. The vehicle navigation maps 130 can display, via a display screen (not shown), the specific location of the autonomous vehicle 110 to the operator 144. The vehicle GNSS 128 communicates geographical information associated with the autonomous vehicle 110 to the AVM algorithm 112*c*. For example, the autonomous vehicle 110 utilizes the AVM algorithm 112*c* to process and send information received from the vehicle GNSS 128 to the infrastructure system 108. As another example, the autonomous vehicle 110 utilizes the AVM algorithm 112*c* to process and send information from the vehicle GNSS 128 to the vehicle manufacturing cloud system 102 directly. The AVM algorithm 112*c* is configured to communicate information and/or instructions to the vehicle GNSS 128 received from the infrastructure system 108 and/or the vehicle manufacturing cloud system 102. As another example, the autonomous vehicle 110 utilizes the AVM algorithm 112*c* to process and send information associated with the vehicle navigation maps 130 to the infrastructure system 108. As another example, the autonomous vehicle 110 utilizes the AVM algorithm 112*c* to process and send information from the vehicle navigation maps 130 to the vehicle manufacturing cloud system 102 directly. The AVM algorithm 112*c* is configured to communicate information and/or instructions to the vehicle navigation maps 130 received from the infrastructure system 108 and/or the vehicle manufacturing cloud system 102.

The delivery manager cloud system 104 wirelessly communicates (e.g., receives and/or sends instructions and/or information) with one or more of a rental agencies cloud system 134, a valet parking agencies cloud system 136, an insurance agencies cloud system 138, and/or a dealership 140. For example, the delivery manager cloud system 104 can facilitate the delivery of the one or more autonomous vehicles to any of the rental agencies cloud system 134, the valet parking agencies cloud system 136, the insurance agencies cloud system 138, and/or the dealership 140. The delivery manager cloud system 104 also wirelessly communicates with the vehicle customer web-portal account cloud system 106. It should be understood that other cloud systems can be included in one or more examples.

The delivery manager cloud system 104 wirelessly communicates with a user device 142 such as a mobile device, a display panel, and/or a computer. The autonomous vehicle 110 also wirelessly communicates directly with the user device 142. As an example, the autonomous vehicle 110 is configured to process information and/or instructions received from the user device 142. For example, the operator 144 engages with the user device 142 via an application that organizes any information and/or instructions received from the vehicle customer web-portal account cloud system 106 and/or the autonomous vehicle 110. As another example, the operator 144 may send one or more instructions to the vehicle customer web-portal account cloud system 106 such as making a selection of which vehicle the operator 144 would like to receive from any of a rental agency (not shown) associated with the rental agencies cloud system 134, a valet parking agency (not shown) associated with the valet parking agencies cloud system 136, an insurance agency (not shown) associated with the insurance agencies cloud system 138, and/or the dealership 140.

Figure 2:
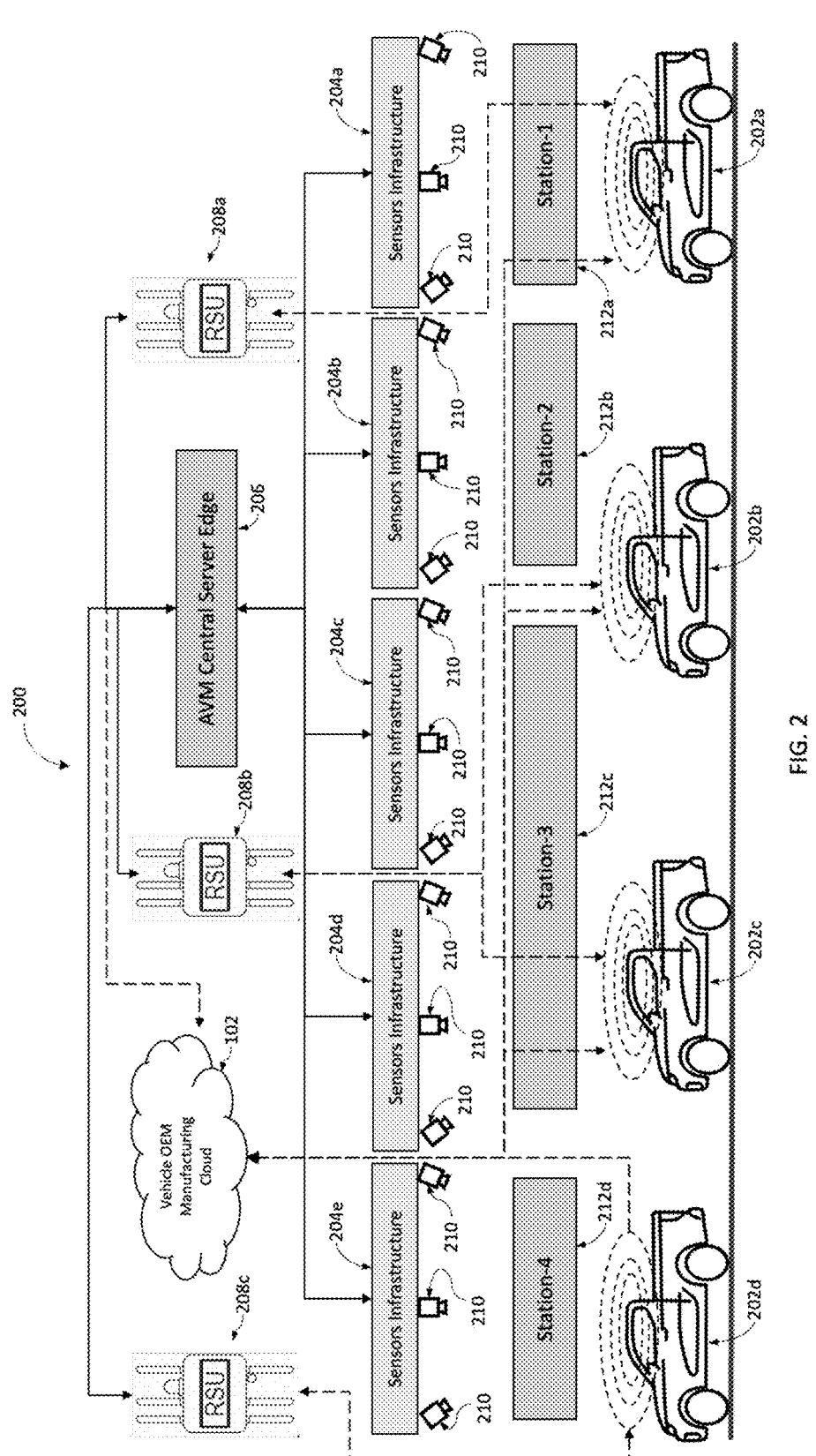
FIG. 2 illustrates an example system for marshaling one or more vehicles in accordance with various implementations.

FIG. 2 is illustrative of a first example of a marshaling environment 200 that facilitates the engagement of one or more autonomous vehicles 202*a*-202*d* (e.g., the autonomous vehicle 110) with one or more infrastructure systems 204*a*-204*e* (e.g., the infrastructure system 108). For example, this first example of the marshaling environment 200 is located inside or associated with a manufacturing plant. Generally, an AVM central server edge 206 (e.g., an edge processor) is configured to receive one or more signals from one or more road-side units (RSUs) 208*a*-208*c* and/or from the one or more sensor infrastructure systems 204*a*-204*e* (e.g., the infrastructure system 108) while communicating with the vehicle manufacturing cloud system 102. Each of the autonomous vehicles 202*a*-202*d* are wirelessly connected to a respective RSU of the one or more RSUs 208*a*-208*c*, wherein each of the autonomous vehicles 202*a*-202*d* are configured to communicate with the one or more RSUs 208*a*-208*c*. Additionally, each of the autonomous vehicles 202*a*-202*d* are wirelessly communicative with the vehicle manufacturing cloud system 102, providing each of the autonomous vehicles 202*a*-202*d* the ability to communicate directly with the vehicle manufacturing cloud system 102.

In some examples, the one or more RSUs 208*a*-208*c* are equipped with a cellular vehicle-to-infrastructure communication system (referred to as "CV2X systems"). As an example, the one or more RSUs 208*a*-208*c* are equipped with a PC5-based C-V2X that employs a RF sidelink communication for low latency vehicle sensor connectivity. The one or more RSUs 208*a*-208*c* are configured to broadcast, for example, the infrastructure sensor data to the one or more autonomous vehicles 202*a*-202*d* via one or more wireless communication protocols, such as a CV2X protocol, a private and/or public cellular protocol, a Wi-Fi protocol, a long range (LoRA) signal protocol, a Bluetooth protocol, and/or a UWB protocol. The one or more RSUs 208*a*-208*c* are also configured to receive messages from the one or more autonomous vehicles 202*a*-202*d*. Accordingly, the one or more RSUs 208*a*-208*c* may include various components for performing the operations described herein, such as, but not limited to, transceivers, processor circuits, memory circuits, routers, and/or input/output interface hardware.

Each of the one or more infrastructure systems 204*a*-204*e* include one or more infrastructure sensors 210 (e.g., the one or more sensors 114) that may be image sensors that provide image data of an environment (e.g., a manufacturing environment) to the AVM central server edge 206. For example, the one or more infrastructure sensors 210 may include, but are not limited to, a two-dimensional (2D) camera, a three-dimensional (3D) camera, an infrared sensor, a radar scanner, a laser scanner, a light detection and ranging (LIDAR) sensor, an ultrasonic sensor, among others. In one form, the one or more infrastructure systems 204*a*-204*e* provide pose, routing, and obstacle data (among other data) of the manufacturing environment to the AVM central server edge 206. In one form, the one or more infrastructure systems 204*a*-204*e* are integrated within an infrastructure element included as part of the manufacturing environment, such as a tower, a light pole, a building, a sign, among other fixed elements of the manufacturing environment. In one form, the one or more infrastructure systems 204*a*-204*e* are integrated within a moveable element as part of the manufacturing environment, such as an unmanned aerial vehicle (UAV).

Further illustrated in FIG. 2 are a plurality of workstations 212*a*-212*d*. Each workstation of the plurality of workstations 212*a*-212*d* are representative of various assembly points in a manufacturing facility. For example, each of the workstations of the plurality of workstations 212*a*-212*d* may specifically correspond (e.g., be associated with) with one or more particular infrastructure systems of the one or more infrastructure systems 204*a*-204*e*. As an example, the infrastructure system 204*a* corresponds to the workstation 212*a*. As another example, the infrastructure system 204*b* corresponds to the workstation 212*b*. As an additional example, the infrastructure systems 204*c* and 204*d* correspond to the workstation 212*c*. As yet another example, the infrastructure system 204*e* corresponds to the workstation 212*d*. It should be appreciated that multiple systems can correspond to one workstation and/or multiple workstations can correspond to one system, as well as other combinations.

As the one or more autonomous vehicles 202*a*-202*d* are marshaled past each of the plurality of workstations 212*a*-212*d*, the one or more infrastructure sensors 210 associated with the respective infrastructure system of the one or more infrastructure systems 204*a*-204*e* acquires one or more images (and/or other sensed data) of the exterior of each of the one or more autonomous vehicles 202a-202d. In some examples, each of the one or more infrastructure systems 204a-204e include an artificial intelligence (AI)/Neural Network module (e.g., the AVM algorithm 112b). For example, the AI/Neural Network module is a pre-trained module. However, it is understood that the AI/Neural Network module may utilize machine learning technology to train itself in real-time based at least on the one or more images.

Each of the one or more infrastructure systems 204a-204e are configured to utilize the AI/Neural Network module to identify a vehicle quality or condition associated with each of the one or more autonomous vehicles 202a-202d (e.g., associated with an exterior surface of the one or more autonomous vehicles 202a-202d), detect the vehicle quality or condition associated with each of the one or more autonomous vehicles 202a-202d, validate the vehicle quality or condition associated with each of the one or more autonomous vehicles 202a-202d, or a combination thereof. As an example, the AI/Neural Network module identifies, detects, and/or validates the vehicle quality associated with each of the one or more autonomous vehicles 202a-202d based on the one or more images and/or information relating to each of the one or more autonomous vehicles 202a-202d provided by the vehicle manufacturing cloud system 102. As another example, the AI/Neural Network module identifies, detects, and/or validates the vehicle quality associated with each of the one or more autonomous vehicles 202a-202d based on the one or more images and/or information relating to each of the one or more autonomous vehicles 202a-202d provided by any component of the AVM system 100. As yet another example, the identification, detection, and/or validation associated with the exterior of any of the one or more autonomous vehicles 202a-202d can be completed as part of a quality check of the exterior of any of the one or more autonomous vehicles 202a-202d. The quality check of the exterior of any of the one or more autonomous vehicles 202a-202d can include a determination of a condition of a vehicle paint, one or more vehicle dents, a vehicle exterior part misalignment, an incorrect trim package associated with a particular autonomous vehicle of the one or more autonomous vehicles 202a-202d, or a combination thereof, as well as other exterior conditions and/or quality issues. For example, the determination of the condition of the exterior of any of the one or more autonomous vehicles 202a-202d may be based on a threshold level of any quality issues associated with the exterior of any of the one or more autonomous vehicles 202a-202d. As another example, the threshold level of any quality issues associated with the exterior of any of the one or more autonomous vehicles 202a-202d may include any level and/or quantity of quality issues.

Once the one or more infrastructure systems 204a-204e have completed the quality check, the one or more infrastructure systems 204a-204e informs the vehicle manufacturing cloud system 102 of a condition (e.g., exterior condition) of each autonomous vehicle of the one or more autonomous vehicles 202a-202d. For example, any of the specific infrastructure systems of the one or more infrastructure systems 204a-204e corresponding to any of the specific workstations of the plurality of workstations 212a-212d may report the condition of a particular autonomous vehicle of the one or more autonomous vehicles 202a-202d to the vehicle manufacturing cloud system 102. As another example, the one or more infrastructure systems 204a-204e may report an aggregated condition of the particular autonomous vehicle of the one or more autonomous vehicles 202a-202d to the vehicle manufacturing cloud system 102 based on a combination of the one or more images obtained at each of the plurality of workstations 212a-212d. It should be appreciated, that the quality check and/or the determination of the condition of the one or more autonomous vehicles 202a-202d can relate to any external condition, and in some examples, can include one or more internal conditions of the one or more autonomous vehicles 202a-202d that affect the external quality of the one or more autonomous vehicles 202a-202d.

The report received by the vehicle manufacturing cloud system 102 associated with the condition of the one or more autonomous vehicles 202a-202d allows for the vehicle manufacturing cloud system 102 to determine whether any of the one or more autonomous vehicles 202a-202d should be marshaled to a repair workstation (e.g., a repair bay located within the manufacturing facility). For example, an autonomous vehicle of the one or more autonomous vehicles 202a-202d is marshaled to the repair workstation in response to the condition of the autonomous vehicle of the one or more autonomous vehicles 202a-202d not meeting the quality check based at least on quality of condition data obtained as described in more detail herein.

Based on the determination of whether any of the one or more autonomous vehicles 202a-202d should be marshaled to the repair workstation, the vehicle manufacturing cloud system 102 can instruct any of the one or more autonomous vehicles 202a-202d to attain one or more documentations associated with the condition of exterior of the particular autonomous vehicle of the one or more vehicles 202a-202d. As an example, the instructions sent by the vehicle manufacturing cloud system 102 are wirelessly communicated to any of the one or more autonomous vehicles 202a-202d via any of the one or more RSUs 208a-208c by utilizing a CV2X-PCS messaging protocol. As another example, the instructions sent by the vehicle manufacturing cloud system 102 are wirelessly communicated to any of the one or more autonomous vehicles 202a-202d by utilizing a cellular-Uu messaging protocol. As yet another example, the one or more documentations can include a geo-location of the particular autonomous vehicle of the one or more autonomous vehicles 202a-202d, one or more snap-shot recordings from the particular vehicle's 360-degree sensors (e.g., the one or more vehicle sensors 124), or a combination thereof, as well as other information (e.g., timestamp information, etc.).

In the instance wherein the one or more documentations associated with the condition of the exterior of the particular autonomous vehicle of the one or more vehicles 202a-202d has been successfully acquired, the particular autonomous vehicle of the one or more vehicles 202a-202d transmits the one or more documentations to the one or more infrastructure systems 204a-204e. For example, the one or more infrastructure systems 204a-204e may store the one or more documentations in a local database, a remote database, a storage cloud, or a combination thereof. As another example, the saved one or more documentations may later facilitate identification and/or confirmation of the condition of any of the one or more autonomous vehicles 202a-202d at different locations and/or points in time when such information may be desired or required, such as by an enforcement investigation relating to the condition of any of the one or more autonomous vehicles 202a-202d at any given time.

Figure 3:
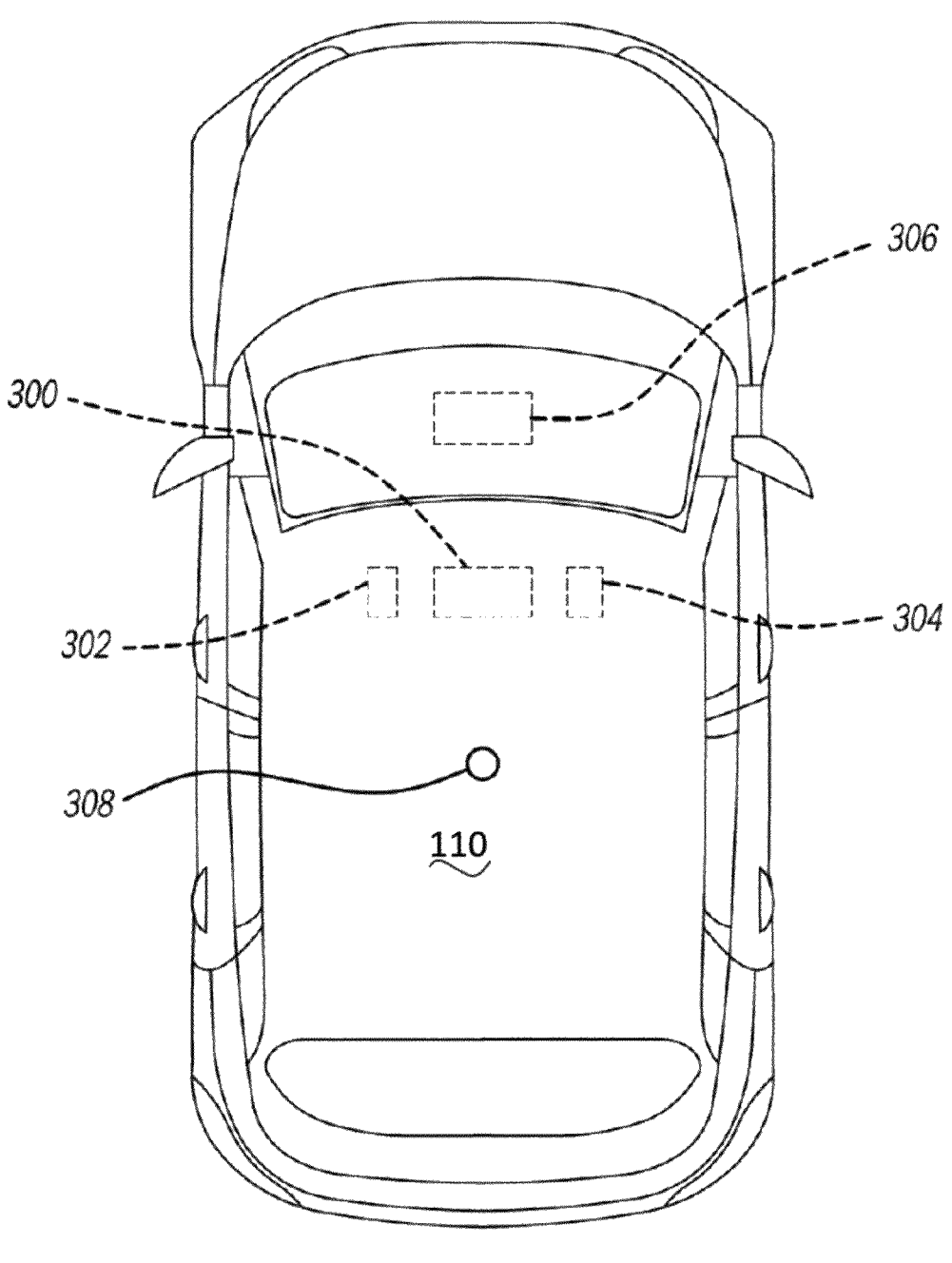
FIG. 3 illustrates an example vehicle associated with the systems shown in FIGS. 1 and 2 in accordance with various implementations.

Referring to FIG. 3, in various forms, each vehicle of the one or more autonomous vehicles 202a-202d (e.g., the autonomous vehicle 110) may be powered in a variety of ways, for example, with an electric motor and/or an internal combustion engine. The one or more autonomous vehicles 202a-202d may be any type of vehicle powered by an electric motor and/or an internal combustion engine such as a car, a truck, a robot, a plane and/or a boat, as non-limiting examples. Each of the one or more autonomous vehicles 202a-202d include a vehicle controller 300, one or more actuators 302, a plurality of on-board sensors 304, and a human machine interface (HMI) 306. Each of the one or more autonomous vehicles 202a-202d also have a reference point 308, that is, a specified point within the space defined by a vehicle body, for example, a geometrical center point at which respective longitudinal and lateral center axes of a particular vehicle of the one or more autonomous vehicles 202a-202d intersect. The reference point 308 identifies the location of the particular vehicle of the one or more autonomous vehicles 202a-202d, for example, a point at which the particular vehicle is located as the particular vehicle navigates toward a waypoint.

The vehicle controller 300, in some examples, is configured or programmed to control the operation of the brakes, propulsion, steering, climate control, interior and/or exterior lights, etc. of the autonomous vehicles 202a-202d, as well as to determine whether and when the vehicle controller 300, as opposed to a human operator, is to control such operations. It is understood that any of the operations associated with the one or more autonomous vehicles 202a-202d may be facilitated via an automated, a semi-automated, or a manual mode. For example, the automated mode may facilitate for any of the operations to be fully controlled by the vehicle controller 300 without the aid of a user. As another example, the semi-automated mode may facilitate for any of the operations to be at least partially controlled by the vehicle controller 300 and/or the user. As a further example, the manual mode may facilitate for any of the operations to be fully controlled by the user.

The vehicle controller 300 includes or may be communicatively coupled to (e.g., via a vehicle communications bus) one or more processors, for example, controllers or the like included in the one or more autonomous vehicles 202a-202d for monitoring and/or controlling various vehicle controllers, such as a powertrain controller, a brake controller, a steering controller, etc. The vehicle controller 300 is generally arranged for communications on a vehicle communication network that can include a bus in each autonomous vehicle of the one or more autonomous vehicles 202a-202d such as a controller area network (CAN) or the like, and/or other wired and/or wireless mechanisms.

The vehicle controller 300 transmits messages, via a vehicle network, to various devices in any of the one or more autonomous vehicles 202a-202d and/or receives messages from the various devices, for example, the one or more actuators 302, the HMI 306, etc. Alternatively, or additionally, in cases where the vehicle controller 300 includes multiple devices, the vehicle communication network is utilized for communications between devices represented as the vehicle controller 300 in this disclosure. Further, as discussed below, various other controllers and/or sensors provide data to the vehicle controller 300 via the vehicle communication network.

In addition, the vehicle controller 300 is configured for communicating through a wireless vehicular communication interface with other traffic objects (for example, vehicles, infrastructures, pedestrians, etc.), such as, via a vehicle-to-vehicle communication network. The vehicle controller 300 is also configured for communicating through a vehicle-to-infrastructure communication network, such as communicating with the Infrastructure controller 115 of the infrastructure system 108. The vehicular communication network represents one or more mechanisms by which the vehicle controller 300 of any of the one or more autonomous vehicles 202a-202d communicate with other traffic objects, and may be one or more of wireless communication mechanisms, including any desired combination of wireless (e.g., cellular, wireless, satellite, microwave, and radio frequency) communication mechanisms and any desired network topology (or topologies when multiple communication mechanisms are utilized). Examples of vehicular communication networks include, among others, cellular, Bluetooth®, IEEE 802.11, dedicated short range communications (DSRC), and/or wide area networks (WAN), including the Internet, providing data communication services.

The vehicle actuators 302 are implemented via circuits, chips, or other electronic and/or mechanical components that can actuate various vehicle subsystems in accordance with appropriate control signals. The vehicle actuators 302 may be used to control braking, acceleration, and/or steering of the one or more autonomous vehicles 202a-202d. The vehicle controller 300 can be programmed to actuate the vehicle actuators 302 including propulsion, steering, and/or braking based on the planned acceleration or deceleration of the one or more autonomous vehicles 202a-202d.

The sensors 304 include a variety of devices to provide data to the vehicle controller 300. For example, the sensors 304 may include object detection sensors such as lidar sensor(s) disposed on or in the one or more autonomous vehicles 202a-202d that provide relative locations, sizes, and shapes of one or more targets surrounding the one or more autonomous vehicles 202a-202d, for example, additional vehicles, bicycles, pedestrians, robots, drones, etc., travelling next to, ahead, and/or behind the one or more autonomous vehicles 202a-202d. As another example, one or more of the sensors can be radar sensors affixed to one or more bumpers of the one or more autonomous vehicles 202a-202d that may provide locations of the target(s) relative to the location of each of the one or more autonomous vehicles 202a-202d.

The object detection sensors may include a camera sensor, for example, to provide a front view, side view, rear view, etc., providing images from an area surrounding the one or more autonomous vehicles 202a-202d. For example, the vehicle controller 300 may be programmed to receive sensor data from a camera sensor(s) and to implement image processing techniques to detect a road, infrastructure elements, etc. The vehicle controller 300 may be further programmed to determine a current vehicle location based on location coordinates, for example, GPS coordinates, received from the one or more autonomous vehicles 202a-202d and indicative of a location of any of the one or more autonomous vehicles' 202a-202d location from a GPS sensor.

The HMI 306 is configured to receive information from a user, such as a human operator, during operation of the one or more autonomous vehicles 202a-202d. Moreover, the HMI 306 is configured to present information to the user, such as, an occupant of any of the one or more autonomous vehicles 202a-202d. In some variations, the vehicle controller 300 is programmed to receive destination data, for example, location coordinates, from the HMI 306.

Accordingly, the one or more autonomous vehicles 202a-202d can be autonomously guided toward a waypoint using a combination of the infrastructure sensors 210 and the vehicle sensors (e.g., the onboard sensors 304). Routing can be done using vehicle location, distance to travel, queue in line for vehicle marshaling, etc. One or more autonomous vehicles 202a-202d requiring additional charge/fuel can be prepped ahead of joining the queue. Other autonomous vehicles of the one or more autonomous vehicles 202a-202d destined to a particular waypoint operate in the same way, so that movement of an entire fleet can be coordinated. The movements of the entire fleet are coordinated through a central fleet-management system that directs all traffic and logistics from an assembly plant to the waypoint. For example, vehicles within the fleet can be organized in a pre-sorted order, controlled to move to certain locations, removed from the order such as for repair or further analysis of a detected quality issue or condition, etc.

The centralized fleet-management application, in various examples, has complete knowledge of the one or more autonomous vehicles 202a-202d in its control (for example, current location, destination, special notes, etc.), which adds accountability and traceability to the distribution process. The fleet-management is coordinated within and/or across sites to optimize delivery timing of each of the one or more autonomous vehicles 202a-202d to the waypoint. Several logistics applications can be used, which may involve a combination of an infrastructure system (e.g., the infrastructure system 108) integrated with a traffic-management algorithm to queue and deconflict vehicles in real-time. Accordingly, the fleet-management application queues one or more autonomous vehicles 202a-202d based on unique characteristics (how far does a particular vehicle of the one or more autonomous vehicles 202a-202d need to travel, what traffic is along the route, when does the particular vehicle of the one or more autonomous vehicles 202a-202d need to get to a particular location to line up in the correct order, etc.).

Figure 4:
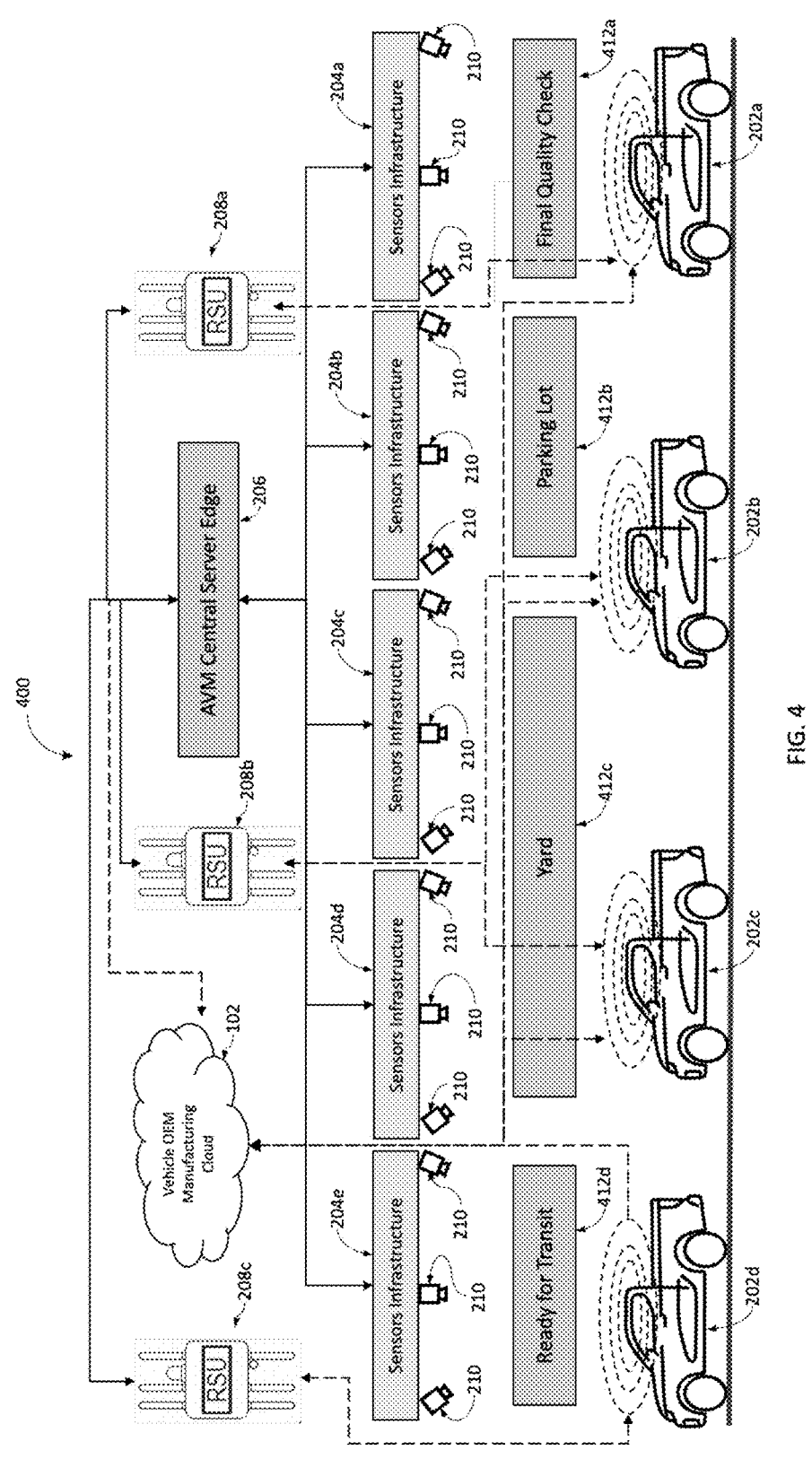
FIGS. 4-7 illustrate additional example systems for marshaling the one or more vehicles in accordance with various implementations.

Referring to FIG. 4, a second example of a marshaling environment 400 is illustrated. For example, this second example of the marshaling environment 400 is located outside a manufacturing plant (e.g., a parking lot). Further illustrated in FIG. 4 are a plurality of checkpoints 412a-412d associated with varying points that span the parking lot. For example, each of the checkpoints of the plurality of checkpoints 412a-412d may specifically correspond with one or more particular infrastructure systems of the one or more infrastructure systems 204a-204e. As an example, the infrastructure system 204a corresponds to a first area of the parking lot 412a (e.g., a first checkpoint 412a of the plurality of checkpoints 412a-412d) where a quality check is performed and within range of the infrastructure system 204a.

As another example, the infrastructure system 204b corresponds to a second area of the parking lot 412b (e.g., a second checkpoint 412b of the plurality of checkpoints 412a-412d) that is within range of the infrastructure system 204b. As an additional example, the infrastructure systems 204c and 204d correspond to a third area of the parking lot 412c (e.g., a third checkpoint 412c of the plurality of checkpoints 412a-412d) that is within range of the infrastructure systems 204c and 204d. As yet another example, the infrastructure system 204e corresponds to a fourth area of the parking lot 412d (e.g., a fourth checkpoint 412d of the plurality of checkpoints 412a-412d) wherein the one or more vehicles 202a-202d await transit and within range of the infrastructure system 204e. It should be appreciated that multiple systems can correspond to one area of the parking lot and/or multiple areas of the parking lot can correspond to one system, as well as other combinations.

As the one or more autonomous vehicles 202a-202d are marshaled past each of the plurality of checkpoints 412a-412d, the one or more infrastructure sensors 210 associated with the respective infrastructure system of the one or more infrastructure systems 204a-204e acquires one or more images (and/or other sensed data) of the exterior associated with each of the one or more autonomous vehicles 202a-202d. The one or more images are then used as a basis by which the quality check is performed by the one or more infrastructure systems 204a-204e.

Once the one or more infrastructure systems 204a-204e have completed the quality check, the one or more infrastructure systems 204a-204e informs the vehicle manufacturing cloud system 102 of a condition of each autonomous vehicle of the one or more autonomous vehicles 202a-202d. For example, any of the specific infrastructure systems of the one or more infrastructure systems 204a-204e corresponding to any of the specific checkpoints of the plurality of checkpoints 412a-412d may report the condition a particular autonomous vehicle of the one or more autonomous vehicles 202a-202d to the vehicle manufacturing cloud system 102. As another example, the one or more infrastructure systems 204a-204e may report an aggregated condition of the particular autonomous vehicle of the one or more autonomous vehicles 202a-202d to the vehicle manufacturing cloud system 102 based on a combination of the one or more images obtained at each of the one or more checkpoints 412a-412d.

The report received by the vehicle manufacturing cloud system 102 associated with the condition of the one or more autonomous vehicles 202a-202d allows for the vehicle manufacturing cloud system 102 to determine whether any of the one or more autonomous vehicles 202a-202d should be marshaled to the repair workstation (not shown) or other workstation (e.g., a workstation outside of the normal autonomous flow). For example, an autonomous vehicle of the one or more autonomous vehicles 202a-202d is marshaled to the repair workstation in the instance wherein the condition of the autonomous vehicle of the one or more autonomous vehicles 202a-202d does not meet the quality check. Based on the determination of whether any of the one or more autonomous vehicles 202a-202d should be marshaled to the repair workstation, the vehicle manufacturing cloud system 102 can instruct any of the one or more autonomous vehicles 202a-202d to attain one or more documentations associated with the condition of exterior of the particular autonomous vehicle of the one or more vehicles 202a-202d. For example, the one or more documentations (e.g., reports) can include a geo-location of the particular autonomous vehicle of the one or more autonomous vehicles 202a-202d, one or more snap-shot recordings from the particular vehicle's 360-degree sensors (e.g., the one or more vehicle sensors 124), or a combination thereof.

The report(s) may also include status information relating to whether the particular autonomous vehicle of the one or more autonomous vehicles 202a-202d is ready for transit. The report may also provide instructions to the vehicle manufacturing cloud system 102 to store the one or more images. For example, the stored images may be later used for a comparison dealers and/or customers may make associated with a condition of the exterior of any of the one or more autonomous vehicles 202a-202d at any time. As an example, one or more images taken of a particular autonomous vehicle of the one or more autonomous vehicles 202a-202d as the particular autonomous vehicle exits the fourth area of the parking lot 412d may be used to determine an at-fault party for any quality issues associated with the exterior of the particular autonomous vehicle. For example, the determination of the at-fault party may be based on a comparison of the one or more images taken as the particular autonomous vehicle exited the fourth area of the parking lot 412d representing a first condition of the exterior of the particular autonomous vehicle and a second condition of the exterior of the particular autonomous vehicle at the time of delivery or after delivery of the particular autonomous vehicle to a customer. As another example, the determination of the at-fault party may aid as proof to support an insurance claim that any associated party may make regarding the condition of the exterior of the particular autonomous vehicle.

Figure 5:
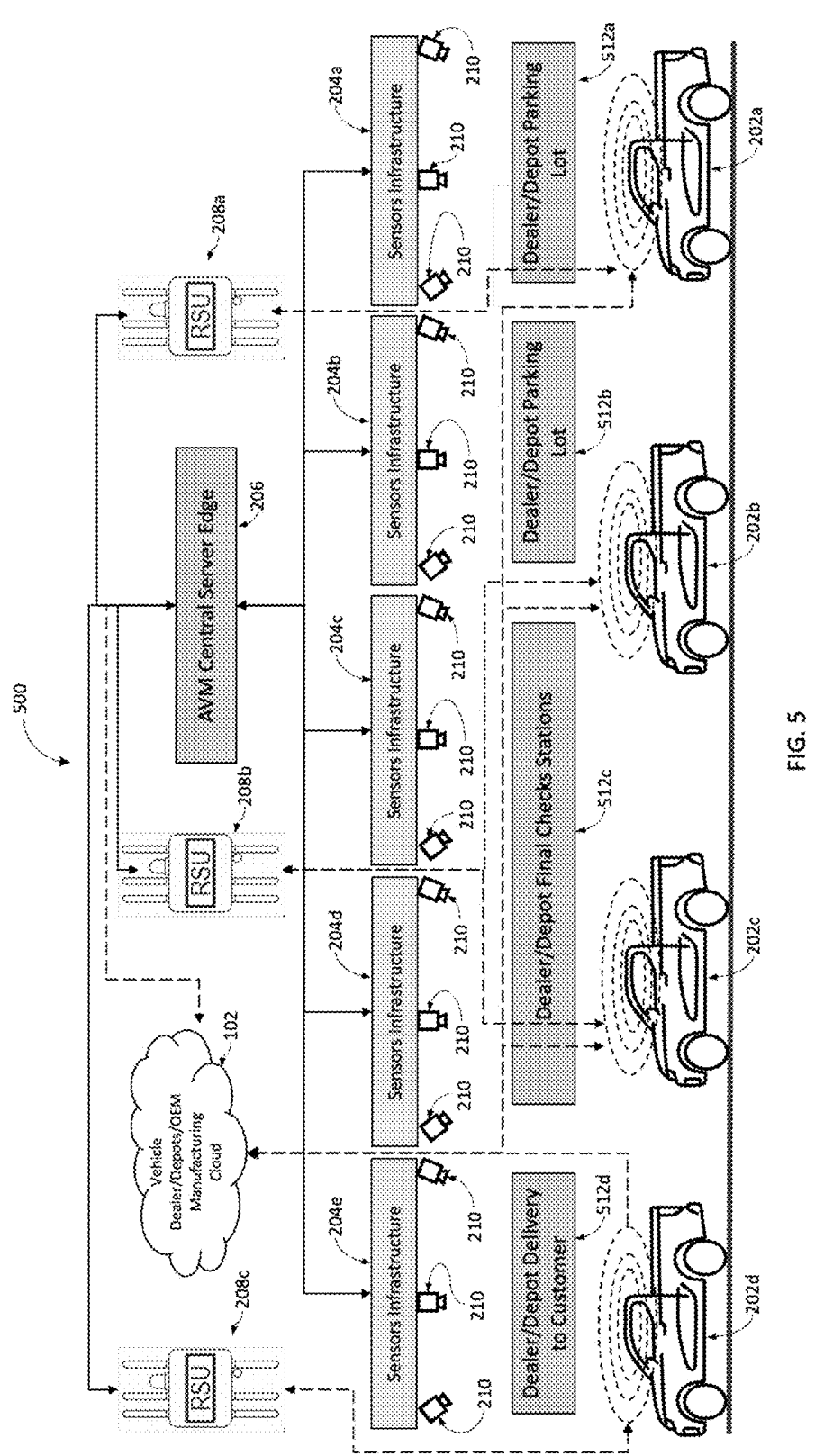

FIG. 5 is illustrative of a third example of a marshaling environment 500. For example, this third example of the marshaling environment 500 is located within a dealer/depot setting (e.g., a car dealership). Further illustrated in FIG. 5 are a plurality of checkpoints 512a-512d associated with varying points that span a depot parking lot. For example, each of the checkpoints of the plurality of checkpoints 512a-512d may specifically correspond with one or more particular infrastructure systems of the one or more infrastructure systems 204a-204e. As an example, the infrastructure system 204a corresponds to a first area of the dealer/depot parking lot 512a (e.g., a first checkpoint 512a of the plurality of checkpoints 512a-512d) that is within range of the infrastructure system 204a.

As another example, the infrastructure system 204b corresponds to a second area of the dealer/depot parking lot 512b (e.g., a second checkpoint 512b of the plurality of checkpoints 512a-512d) that is within range of the infrastructure system 204b. As an additional example, the infrastructure systems 204c and 204d correspond to a third area of the dealer/depot parking lot 512c (e.g., a third checkpoint 512c of the plurality of checkpoints 512a-512d) where a final check is performed and within range of the infrastructure systems 204c and 204d. As yet another example, the infrastructure system 204e corresponds to a fourth area of the dealer/depot parking lot 512d (e.g., a fourth checkpoint 512d of the plurality of checkpoints 512a-512d) wherein the one or more vehicles 202a-202d await delivery from the dealer/depot parking to the customer and within range of the infrastructure system 204e. It should be appreciated that multiple systems can correspond to one checkpoint and/or multiple checkpoints can correspond to one system, as well as other combinations.

As the one or more autonomous vehicles 202a-202d are marshaled past each of the plurality of checkpoints 512a-512d, the one or more infrastructure sensors 210 associated with the respective infrastructure system of the one or more infrastructure systems 204a-204e acquires one or more images (and/or other sensed data) of the exterior of each of the one or more autonomous vehicles 202a-202d. The one or more images are then used as a basis by which the quality check is performed by the one or more infrastructure systems 204a-204e.

Once the one or more infrastructure systems 204a-204e have completed the quality check, the one or more infrastructure systems 204a-204e informs the vehicle manufacturing cloud system 102 of a condition of each autonomous vehicle of the one or more autonomous vehicles 202a-202d. For example, any of the specific infrastructure systems of the one or more infrastructure systems 204a-204e corresponding to any of the specific checkpoints of the plurality of checkpoints 512a-512d may report the condition a particular autonomous vehicle of the one or more autonomous vehicles 202a-202d to the vehicle manufacturing cloud system 102. As another example, the one or more infrastructure systems 204a-204e may report an aggregated condition of the particular autonomous vehicle of the one or more autonomous vehicles 202a-202d to the vehicle manufacturing cloud system 102 based on a combination of the one or more images captures at each of the one or more checkpoints 512a-512d.

The report(s) received by the vehicle manufacturing cloud system 102 associated with the condition of the one or more autonomous vehicles 202a-202d allows for the vehicle manufacturing cloud system 102 to determine whether any of the one or more autonomous vehicles 202a-202d should be marshaled to the repair workstation (not shown). For example, an autonomous vehicle of the one or more autonomous vehicles 202a-202d is marshaled to the repair workstation in the instance wherein the condition of the autonomous vehicle of the one or more autonomous vehicles 202a-202d does not meet the quality check. Based on the determination of whether any of the one or more autonomous vehicles 202a-202d should be marshaled to the repair workstation, the vehicle manufacturing cloud system 102 can instruct any of the one or more autonomous vehicles 202a-202d to attain one or more documentations associated with the condition of exterior of the particular autonomous vehicle of the one or more vehicles 202a-202d. For example, the one or more documentations can include a geo-location of the particular autonomous vehicle of the one or more autonomous vehicles 202a-202d, one or more snap-shot recordings from the particular vehicle's 360-degree sensors (e.g., the one or more vehicle sensors 124), or a combination thereof.

The report(s) may also include status information relating to whether the particular autonomous vehicle of the one or more autonomous vehicles 202a-202d is ready for transit. The report(s) may also provide instructions to the vehicle manufacturing cloud system 102 to store the one or more images. For example, the stored images may be later used for a comparison dealers and/or customers may make associated with a condition of the exterior of any of the one or more autonomous vehicles 202a-202d at any time. As an example, one or more images taken of a particular autonomous vehicle of the one or more autonomous vehicles 202a-202d as the particular autonomous vehicle exits the fourth area of the dealer/depot parking lot 512d may be used to determine an at-fault party for any quality issues associated with the exterior of the particular autonomous vehicle. For example, the determination of the at-fault party may be based on a comparison of the one or more images taken as the particular autonomous vehicle exited the fourth area of the dealer/depot parking lot 512d representing a first condition of the exterior of the particular autonomous vehicle and a second condition of the exterior of the particular autonomous vehicle at the time of delivery or after delivery of the particular autonomous vehicle to a customer. As another example, the determination of the at-fault party may aid as proof to support an insurance claim that any associated party may make regarding the condition of the exterior of the particular autonomous vehicle.

Figure 6:
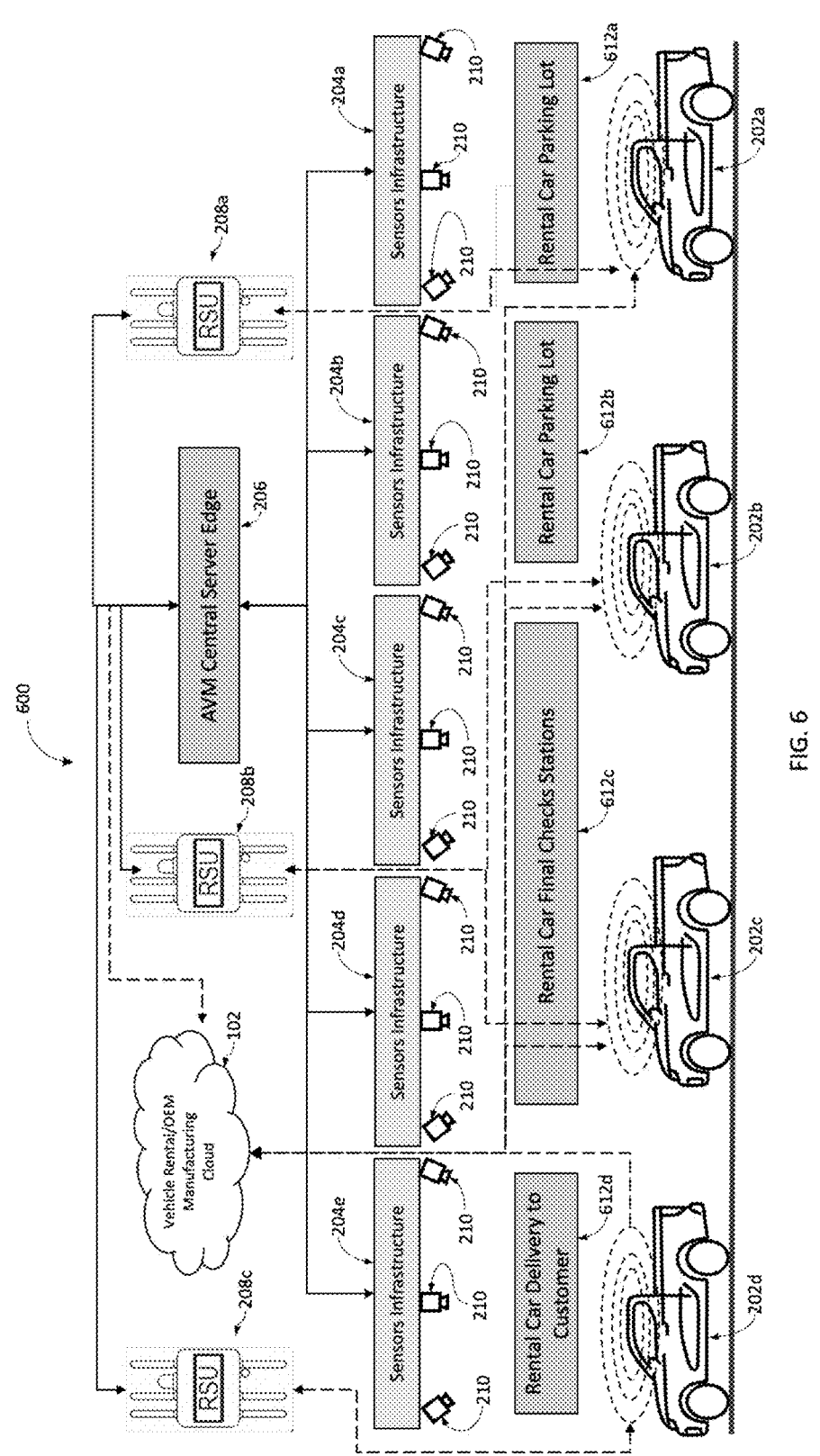

FIG. 6 is illustrative of a third example of a marshaling environment 600. For example, this third example of the marshaling environment 600 is located within a car-rental setting (e.g., a rental agency). Further illustrated in FIG. 6 are a plurality of checkpoints 612a-612d associated with varying points that span a car-rental parking lot. For example, each of the checkpoints of the plurality of checkpoints 612a-612d may specifically correspond with one or more particular infrastructure systems of the one or more infrastructure systems 204a-204e. As an example, the infrastructure system 204a corresponds to a first area of the car-rental parking lot 612a (e.g., a first checkpoint 612a of the plurality of checkpoints 612a-612d) that is within range of the infrastructure system 204a.

As another example, the infrastructure system 204b corresponds to a second area of the car-rental parking lot 612b (e.g., a second checkpoint 612b of the plurality of checkpoints 612a-612d) that is within range of the infrastructure system 204b. As an additional example, the infrastructure systems 204c and 204d correspond to a third area of the car-rental parking lot 612c (e.g., a third checkpoint 612c of the plurality of checkpoints 612a-612d) where a final check is performed and within range of the infrastructure systems 204c and 204d. As yet another example, the infrastructure system 204e corresponds to a fourth area of the car-rental parking lot 612d (e.g., a fourth checkpoint 612d of the plurality of checkpoints 612a-612d) wherein the one or more vehicles 202a-202d await delivery from the car-rental parking lot to the customer and within range of the infrastructure system 204e. It should be appreciated that multiple systems can correspond to one area of the car-rental parking lot and/or multiple areas of the car-rental parking lot can correspond to one system, as well as other combinations.

As the one or more autonomous vehicles 202a-202d are marshaled past each of the plurality of checkpoints 612a-612d, the one or more infrastructure sensors 210 associated with the respective infrastructure system of the one or more infrastructure systems 204a-204e acquires one or more images (and/or other sensed data) of the exterior of each of the one or more autonomous vehicles 202a-202d. The one or more images are then used as a basis by which the quality check is performed by the one or more infrastructure systems 204a-204e. The AI/Neural Network module utilized by the one or more infrastructure systems 204a-204e to perform the quality check may further perform a pre- and post-comparison analysis of the one or more images. For example, the pre- and post-comparison analysis can include identification, classification, and/or detection of any issues associated with the condition of the exterior of any of the one or more autonomous vehicles 202a-202d.

Once the one or more infrastructure systems 204a-204e have completed the quality check, the one or more infrastructure systems 204a-204e informs the vehicle manufacturing cloud system 102 of a condition of each autonomous vehicle of the one or more autonomous vehicles 202a-202d. For example, any of the specific infrastructure systems of the one or more infrastructure systems 204a-204e corresponding to any of the specific checkpoints of the plurality of checkpoints 612a-612d may report the condition a particular autonomous vehicle of the one or more autonomous vehicles 202a-202d to the vehicle manufacturing cloud system 102. As another example, the one or more infrastructure systems 204a-204e may report an aggregated condition of the particular autonomous vehicle of the one or more autonomous vehicles 202a-202d to the vehicle manufacturing cloud system 102 based on a combination of the one or more images captures at each of the one or more checkpoints 612a-612d.

The report(s) received by the vehicle manufacturing cloud system 102 associated with the condition of the one or more autonomous vehicles 202a-202d allows for the vehicle manufacturing cloud system 102 to determine whether any of the one or more autonomous vehicles 202a-202d should be marshaled to the repair workstation (not shown). For example, an autonomous vehicle of the one or more autonomous vehicles 202a-202d is marshaled to the repair workstation in the instance wherein the condition of the autonomous vehicle of the one or more autonomous vehicles 202a-202d does not meet the quality check. Based on the determination of whether any of the one or more autonomous vehicles 202a-202d should be marshaled to the repair workstation, the vehicle manufacturing cloud system 102 can instruct any of the one or more autonomous vehicles 202a-202d to obtain one or more documentations associated with the condition of exterior of the particular autonomous vehicle of the one or more vehicles 202a-202d. For example, the one or more documentations can include a geo-location of the particular autonomous vehicle of the one or more autonomous vehicles 202a-202d, one or more snap-shot recordings from the particular vehicle's 360-degree sensors (e.g., the one or more vehicle sensors 124), or a combination thereof.

The report(s) may also include status information relating to whether the particular autonomous vehicle of the one or more autonomous vehicles 202a-202d is ready for transit. The report may also provide instructions to the vehicle manufacturing cloud system 102 to store the one or more images. For example, the stored images may be later used for a comparison dealers and/or customers may make associated with a condition of the exterior of any of the one or more autonomous vehicles 202a-202d at any time. As an example, one or more images taken of a particular autonomous vehicle of the one or more autonomous vehicles 202a-202d as the particular autonomous vehicle exits the fourth area of the car-rental parking lot 612d may be used to determine an at-fault party for any quality issues associated with the exterior of the particular autonomous vehicle. For example, the determination of the at-fault party may be based on a comparison of the one or more images taken as the particular autonomous vehicle exited the fourth area of the car-rental parking lot 612d representing a first condition of the exterior of the particular autonomous vehicle and a second condition of the exterior of the particular autonomous vehicle at the time of delivery or after delivery of the particular autonomous vehicle to a customer. As another example, the determination of the at-fault party may aid as proof to support an insurance claim that any associated party may make regarding the condition of the exterior of the particular autonomous vehicle.

Figure 7:
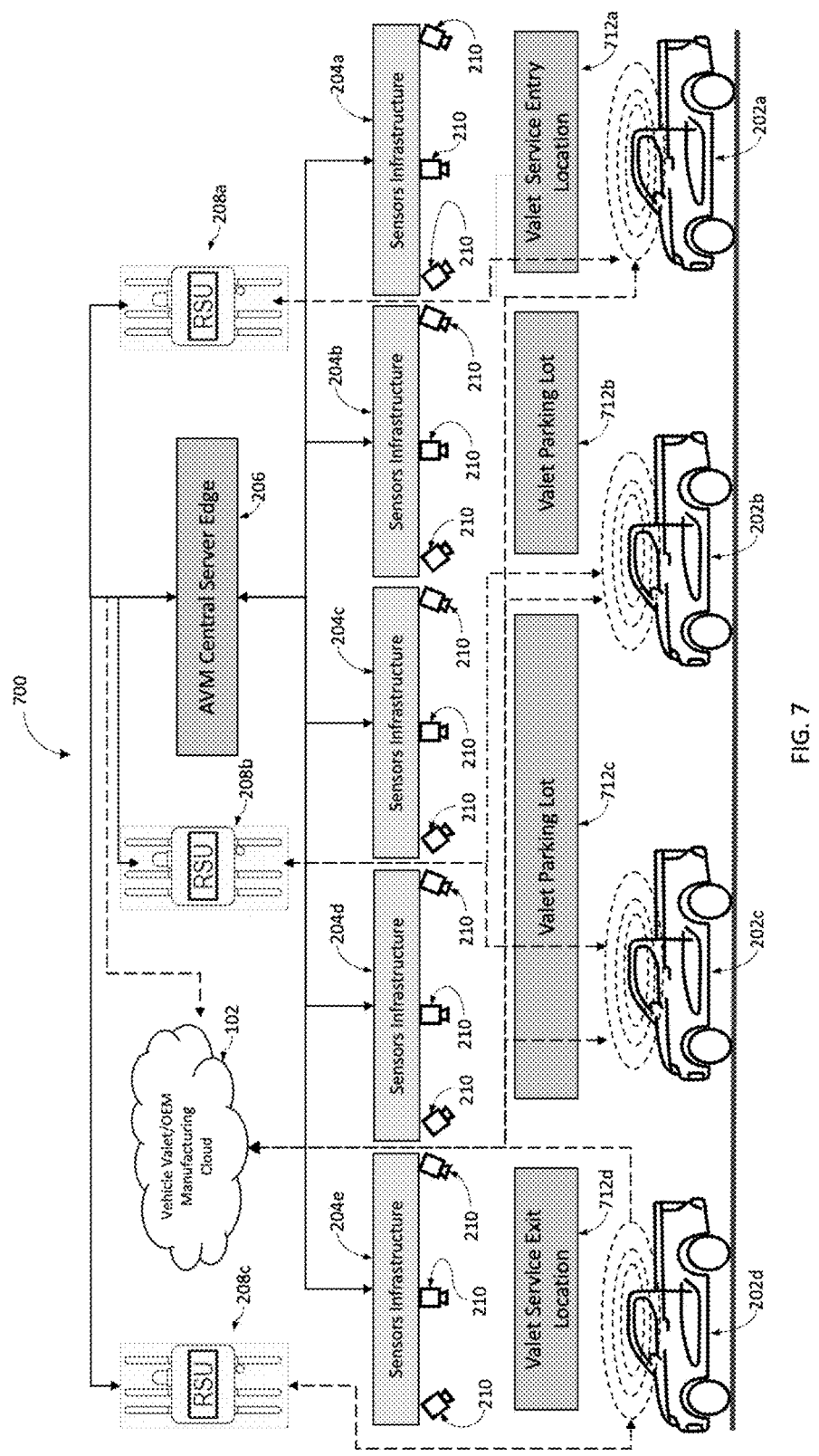

FIG. 7 is illustrative of a fifth example of a marshaling environment 700. For example, this fifth example of the marshaling environment 700 is located within a valet-service setting (e.g., a valet-operated parking lot). Further illustrated in FIG. 7 are a plurality of checkpoints 712a-712d associated with varying points that span a valet-operated parking lot. For example, each of the checkpoints of the plurality of checkpoints 712a-712d may specifically correspond with one or more particular infrastructure systems of the one or more infrastructure systems 204a-204e. As an example, the infrastructure system 204a corresponds to a first area of the valet-operated parking lot 712a (e.g., a first checkpoint 712a of the plurality of checkpoints 712a-712d) associated with a valet service entry location that is within range of the infrastructure system 204a.

As another example, the infrastructure system 204b corresponds to a second area of the valet-operated parking lot 712b (e.g., a second checkpoint 712b of the plurality of checkpoints 712a-712d) that is within range of the infrastructure system 204b. As an additional example, the infrastructure systems 204c and 204d correspond to a third area of the valet-operated parking lot 712c (e.g., a third checkpoint 712c of the plurality of checkpoints 712a-712d) that is within range of the infrastructure systems 204c and 204d. As yet another example, the infrastructure system 204e corresponds to a fourth area of the valet-operated parking lot 712d (e.g., a fourth checkpoint 712d of the plurality of checkpoints 712a-712d) associated with a valet service exit location that is within range of the infrastructure system 204e. It should be appreciated that multiple systems can correspond to one area of the valet-operated parking lot and/or multiple areas of the valet-operated parking lot can correspond to one system, as well as other combinations.

As the one or more autonomous vehicles 202a-202d are marshaled past each of the plurality of checkpoints 712a-712d, the one or more infrastructure sensors 210 associated with the respective infrastructure system of the one or more infrastructure systems 204a-204e acquires one or more images (and/or other sensed data) of the exterior of each of the one or more autonomous vehicles 202a-202d. The one or more images are then used as a basis by which the quality check is performed by the one or more infrastructure systems 204a-204e. The AI/Neural Network module utilized by the one or more infrastructure systems 204a-204e to perform the quality check may further perform a pre- and post-comparison analysis of the one or more images. For example, the pre- and post-comparison analysis can include identification, classification, and/or detection of any issues associated with the condition of the exterior of any of the one or more autonomous vehicles 202a-202d.

Once the one or more infrastructure systems 204a-204e have completed the quality check, the one or more infrastructure systems 204a-204e informs the vehicle manufacturing cloud system 102 of a condition of each autonomous vehicle of the one or more autonomous vehicles 202a-202d. For example, any of the specific infrastructure systems of the one or more infrastructure systems 204a-204e corresponding to any of the specific checkpoints of the plurality of checkpoints 712a-712d may report the condition a particular autonomous vehicle of the one or more autonomous vehicles 202a-202d to the vehicle manufacturing cloud system 102. As another example, the one or more infrastructure systems 204a-204e may report an aggregated condition of the particular autonomous vehicle of the one or more autonomous vehicles 202a-202d to the vehicle manufacturing cloud system 102 based on a combination of the one or more images captures at each of the one or more checkpoints 712a-712d.

The report(s) received by the vehicle manufacturing cloud system 102 associated with the condition of the one or more autonomous vehicles 202a-202d allows for the vehicle manufacturing cloud system 102 to determine whether any of the one or more autonomous vehicles 202a-202d should be marshaled to the repair workstation (not shown). For example, an autonomous vehicle of the one or more autonomous vehicles 202a-202d is marshaled to the repair workstation in the instance wherein the condition of the autonomous vehicle of the one or more autonomous vehicles 202a-202d does not meet the quality check. Based on the determination of whether any of the one or more autonomous vehicles 202a-202d should be marshaled to the repair workstation, the vehicle manufacturing cloud system 102 can instruct any of the one or more autonomous vehicles 202a-202d to obtain one or more documentations associated with the condition of exterior of the particular autonomous vehicle of the one or more vehicles 202a-202d. For example, the one or more documentations can include a geo-location of the particular autonomous vehicle of the one or more autonomous vehicles 202a-202d, one or more snap-shot recordings from the particular vehicle's 360-degree sensors (e.g., the one or more vehicle sensors 124), or a combination thereof.

The report may also include status information relating to whether the particular autonomous vehicle of the one or more autonomous vehicles 202a-202d is ready for transit. The report may also provide instructions to the vehicle manufacturing cloud system 102 to store the one or more images. For example, the stored images may be later used for a comparison dealers and/or customers may make associated with a condition of the exterior of any of the one or more autonomous vehicles 202a-202d at any time. As an example, one or more images taken of a particular autonomous vehicle of the one or more autonomous vehicles 202a-202d as the particular autonomous vehicle exits the fourth area of the valet-operated parking lot 712d may be used to determine an at-fault party for any quality issues associated with the exterior of the particular autonomous vehicle. For example, the determination of the at-fault party may be based on a comparison of the one or more images taken as the particular autonomous vehicle exited the fourth area of the valet-operated parking lot 712d representing a first condition of the exterior of the particular autonomous vehicle and a second condition of the exterior of the particular autonomous vehicle at the time of delivery or after delivery of the particular autonomous vehicle to a customer. As another example, the determination of the at-fault party may aid as proof to support an insurance claim that any associated party may make regarding the condition of the exterior of the particular autonomous vehicle.

Figure 8:
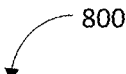
FIG. 8 is a flowchart illustrating an example method for evaluating an exterior condition of any of the one or more vehicles in accordance with various implementations.

FIG. 8 is a flowchart illustrating an example method 800 for evaluating a condition of an exterior of a marshaled vehicle. At operation 802, a first set of images of an exterior of one or more vehicles (e.g., the autonomous vehicle 110) are obtained. For example, the first set of images of the exterior of the one or more vehicles are obtained by one or more sensors (e.g., the one or more sensors 114) of an infrastructure system (e.g., the infrastructure system 108).

At operation 804, a condition of the exterior of the one or more vehicles is determined. For example, the determination of the condition of the exterior of the one or more vehicles is based on the first set of images. As another example, the determination of the condition of the exterior of the one or more vehicles is made by an automated vehicle marshaling algorithm (e.g., the AVM algorithm 112b) of the infrastructure system. As a further example, the condition of the one or more vehicles comprises a condition of a vehicle paint, one or more vehicle dents, a vehicle exterior part misalignment, an incorrect trim package associated with the one or more vehicles, or a combination thereof.

At operation 806, the one or more vehicles are caused to navigate toward a waypoint and/or the one or more vehicles are caused to capture one or more characteristics associated with the one or more vehicles. As another example, the one or more vehicles are caused to navigate toward a waypoint and/or the one or more vehicles are caused to capture one or more characteristics associated with the one or more vehicles based on the condition of the exterior of the one or more vehicles not satisfying a quality check. As a further example, the one or more characteristics associated with the one or more vehicles are captured via one or more vehicle sensors (e.g., the one or more vehicle sensors 124). As an additional example, the waypoint may be any point the one or more vehicles are marshaled toward, such as a repair pay of a manufacturing facility.

In one or more examples, a determination is made regarding whether the condition satisfies the quality check. In another embodiment, a marshaling status of the one or more vehicles is transmitted. For example, the marshaling status of the one or more vehicles is transmitted to a vehicle manufacturing cloud system (e.g., the manufacturing cloud system 102). As another example, the marshaling status of the one or more vehicles is transmitted based on the condition of the exterior of the one or more vehicles not satisfying (not meeting) the quality check. Additionally, the vehicle manufacturing cloud system is caused to store the first set of images of the exterior of the one or more vehicles. For example, the vehicle manufacturing cloud system is caused to store the first set of images of the exterior of the one or more vehicles based on the transmission of the marshaling status of the one or more vehicles.

In some examples, the one or more characteristics are received. For example, the one or more characteristics are received from the one or more vehicles. As another example, the one or more characteristics serve as investigative proof associated with the condition of the exterior of the one or more vehicles. As a further example, the one or more characteristics include a location associated with the one or more vehicles, a snapshot recording of the exterior of the one or more vehicles, or a combination thereof.

In some examples, a second set of images of the exterior of the one or more vehicles are obtained. For example, the second set of images of the exterior of the one or more vehicles are obtained by the one or more sensors of the infrastructure system. Additionally, the first set of images are compared with the second set of images. For example, the comparison of the first set of images with the second set of images is made by the automated vehicle marshaling algorithm and/or a neural network module of the infrastructure system. Furthermore, a difference between the first set of images and the second set of images is determined. For example, the difference between the first set of images and the second set of images is determined based on the comparison of the first set of images and the second set of images (e.g., analysis using one or more image analysis techniques). As another example, an outcome of the determination of the difference between the first set of images and the second set of images is saved in a database associated with the infrastructure system. As yet another example, the saved outcome serves as investigative proof associated with the condition of the exterior of the one or more vehicles.

Thus, one or more examples of the present disclosure provides a means for evaluating the condition of an exterior of a vehicle in various marshaling settings. For example, such an evaluation may include performing one or more quality checks, wherein an algorithm is able to identify, detect, and validate any vehicle exterior issues based on at least one or more images taken of the vehicle as the vehicle is marshaled through an environment.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:

obtaining, by one or more sensors of an infrastructure system, a first set of images of an exterior of one or more vehicles;

determining, by an automated vehicle marshaling algorithm of the infrastructure system, a condition of the exterior of the one or more vehicles, wherein the determination of the condition of the exterior of the one or more vehicles is based on the first set of images;

reporting the condition of the exterior of the one or more vehicles to a vehicle manufacturing cloud system configured to start, stop, or pause progression of the one or more vehicles through a marshaling environment; and in response to the vehicle manufacturing cloud system determining that the condition of the exterior of the one or more vehicles does not satisfy a quality check:

controlling the one or more vehicles to autonomously navigate toward a repair workstation;

capturing one or more characteristics associated with the one or more vehicles;

transmitting a marshaling status of the one or more vehicles to the vehicle manufacturing cloud system, wherein the marshaling status of the one or more vehicles indicates whether the one or more vehicles is ready for transit to a predetermined location; and causing, based on the transmission of the marshaling status of the one or more vehicles, the vehicle manufacturing cloud system to store the first set of images of the exterior of the one or more vehicles.

2. The method of claim 1, wherein the condition of the one or more vehicles comprises a condition of a vehicle paint, one or more vehicle dents, a vehicle exterior part misalignment, an incorrect trim package associated with the one or more vehicles, or a combination thereof.

3. The method of claim 1, further comprising:

receiving, from the one or more vehicles, the one or more characteristics, wherein the one or more characteristics serve as investigative proof associated with the condition of the exterior of the one or more vehicles, and wherein the one or more characteristics include a location associated with the one or more vehicles, a snapshot recording of the exterior of the one or more vehicles, or a combination thereof.

4. The method of claim 1, further comprising:

obtaining, by the one or more sensors of the infrastructure system, a second set of images of the exterior of the one or more vehicles;

comparing, by the automated vehicle marshaling algorithm and a neural network module of the infrastructure system, the first set of images with the second set of images; and determining, based on the comparison of the first set of images and the second set of images, a difference between the first set of images and the second set of images, wherein an outcome of the determination of the difference between the first set of images and the second set of images is saved in a database associated with the infrastructure system, and wherein the saved outcome serves as investigative proof associated with the condition of the exterior of the one or more vehicles.

5. The method of claim 1, wherein the one or more characteristics associated with the one or more vehicles are captured via one or more vehicle sensors.

6. A system comprising:

an infrastructure system configured to:

obtain, by one or more sensors of the infrastructure system, a first set of images of an exterior of one or more vehicles, determine, by an automated vehicle marshaling algorithm of the infrastructure system, a condition of the exterior of the one or more vehicles, wherein the determination of the condition of the exterior of the one or more vehicles is based on the first set of images, report the condition of the exterior of the one or more vehicles to a vehicle manufacturing cloud system, and in response to the condition of the exterior of the one or more vehicles not satisfying a quality check:

control the one or more vehicles to autonomously navigate toward repair workstation, capture one or more characteristics associated with the one or more vehicles, and transmit, based on the condition of the exterior of the one or more vehicles not satisfying the quality check, a marshaling status of the one or more vehicles to the vehicle manufacturing cloud system;

the vehicle manufacturing cloud system configured to:

start, stop, or pause progression of the one or more vehicles through a marshaling environment, receive a marshaling status of the one or more vehicles, wherein the marshaling status of the one or more vehicles indicates whether the one or more vehicles is ready for transit to a predetermined location, and store the first set of images of the exterior of the one or more vehicles; and the one or more vehicles configured to:

capture the one or more characteristics via one or more vehicle sensors, and transmit the one or more characteristics.

7. The system of claim 6, wherein the infrastructure system is further configured to:

determine whether the condition satisfies the quality check.

8. The system of claim 6, wherein the condition of the one or more vehicles comprises a condition of a vehicle paint, one or more vehicle dents, a vehicle exterior part misalignment, an incorrect trim package associated with the one or more vehicles, or a combination thereof.

9. The system of claim 6, wherein the infrastructure system is further configured to:

cause, based on the transmission of the marshaling status of the one or more vehicles, the vehicle manufacturing cloud system to store the first set of images of the exterior of the one or more vehicles.

10. The system of claim 6, wherein the infrastructure system is further configured to:

receive the one or more characteristics, wherein the one or more characteristics serve as investigative proof associated with the condition of the exterior of the one or more vehicles, and wherein the one or more characteristics include a location associated with the one or more vehicles, a snapshot recording of the exterior of the one or more vehicles, or a combination thereof.

11. The system of claim 6, wherein the infrastructure system is further configured to:

obtain, by the one or more sensors of the infrastructure system, a second set of images of the exterior of the one or more vehicles;

compare, by the automated vehicle marshaling algorithm and a neural network module of the infrastructure system, the first set of images with the second set of images; and determine, based on the comparison of the first set of images and the second set of images, a difference between the first set of images and the second set of images, wherein an outcome of the determination of the difference between the first set of images and the second set of images is saved in a database associated with the infrastructure system, and wherein the saved outcome serves as investigative proof associated with the condition of the exterior of the one or more vehicles.

12. One or more non-transitory computer-readable media storing processor-executable instructions that, when executed by at least one processor, cause the at least one processor to:

obtain, by one or more sensors of an infrastructure system, a first set of images of an exterior of one or more vehicles;

determine, by an automated vehicle marshaling algorithm of the infrastructure system, a condition of the exterior of the one or more vehicles, wherein the determination of the condition of the exterior of the one or more vehicles is based on the first set of images;

report the condition of the exterior of the one or more vehicles to a vehicle manufacturing cloud system configured to start, stop, or pause progression of the one or more vehicles through a marshaling environment; and in response to the condition of the exterior of the one or more vehicles not satisfying a quality check:

control the one or more vehicles to autonomously navigate toward a repair workstation, capture one or more characteristics associated with the one or more vehicles;

transmit, based on the condition of the exterior of the one or more vehicles not satisfying the quality check, a marshaling status of the one or more vehicles to the vehicle manufacturing cloud system, wherein the marshaling status of the one or more vehicles indicates whether the one or more vehicles is ready for transit to a predetermined location; and cause, based on the transmission of the marshaling status of the one or more vehicles, the vehicle manufacturing cloud system to store the first set of images of the exterior of the one or more vehicles.

13. The one or more non-transitory computer-readable media of claim 12, wherein the at least one processor is further caused to:

determine whether the condition satisfies the quality check.

14. The one or more non-transitory computer-readable media of claim 12, wherein the condition of the one or more vehicles comprises a condition of a vehicle paint, one or more vehicle dents, a vehicle exterior part misalignment, an incorrect trim package associated with the one or more vehicles, or a combination thereof.

15. The one or more non-transitory computer-readable media of claim 12, wherein the at least one processor is further caused to:

cause, based on the transmission of the marshaling status of the one or more vehicles, the vehicle manufacturing cloud system to store the first set of images of the exterior of the one or more vehicles.

16. The one or more non-transitory computer-readable media of claim 12, wherein the at least one processor is further caused to:

receive, from the one or more vehicles, the one or more characteristics, wherein the one or more characteristics serve as investigative proof associated with the condition of the exterior of the one or more vehicles, and wherein the one or more characteristics include a location associated with the one or more vehicles, a snapshot recording of the exterior of the one or more vehicles, or a combination thereof.

17. The one or more non-transitory computer-readable media of claim 12, wherein the at least one processor is further caused to:

obtain, by the one or more sensors of the infrastructure system, a second set of images of the exterior of the one or more vehicles;

compare, by the automated vehicle marshaling algorithm and a neural network module of the infrastructure system, the first set of images with the second set of images; and determine, based on the comparison of the first set of images and the second set of images, a difference between the first set of images and the second set of images, wherein an outcome of the determination of the difference between the first set of images and the second set of images is saved in a database associated with the infrastructure system, and wherein the saved outcome serves as investigative proof associated with the condition of the exterior of the one or more vehicles.

18. The one or more non-transitory computer-readable media of claim 12, wherein the one or more characteristics associated with the one or more vehicles are captured via one or more vehicle sensors.

* * * * *